(12) United States Patent
Pavlin et al.

(10) Patent No.: US 6,523,119 B2
(45) Date of Patent: *Feb. 18, 2003

(54) SOFTWARE PROTECTION DEVICE AND METHOD

(75) Inventors: Dominique Vincent Pavlin, Montigny le Bretonneux (FR); Mehdi Sotoodeh, Mission Viejo, CA (US); Reed H. Tibbetts, Tustin, CA (US); Patrick N. Godding, Lake Forest, CA (US); Alain Raymond Spiewek, Courbevoie (FR); Roger Graham Nixon, Farnham Common (GB)

(73) Assignee: Rainbow Technologies, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,648

(22) Filed: Dec. 4, 1996

(65) Prior Publication Data

US 2001/0056539 A1 Dec. 27, 2001

(51) Int. Cl.$^7$ .................. G06F 11/30; G06F 12/14; H04L 9/32
(52) U.S. Cl. .................. 713/192; 713/193; 705/55
(58) Field of Search .................. 380/4

(56) References Cited

U.S. PATENT DOCUMENTS

| 3,585,601 A | * | 6/1971 | Lahrson et al. ........... 340/172.5 |
| 4,278,837 A |   | 7/1981 | Best |
| 4,446,519 A |   | 5/1984 | Thomas |
| 4,458,315 A |   | 7/1984 | Uchenick |
| 4,596,898 A |   | 6/1986 | Pemmaraju |
| 4,599,489 A |   | 7/1986 | Cargile |
| 4,634,807 A |   | 1/1987 | Chorley et al. |
| 4,817,140 A |   | 3/1989 | Chandra et al. |
| 4,864,494 A |   | 9/1989 | Kobus, Jr. |
| 4,903,296 A | * | 2/1990 | Chandra et al. ................ 380/4 |
| 4,916,738 A | * | 4/1990 | Chandra et al. ............. 380/25 |
| 5,081,675 A | * | 1/1992 | Kittirutsunetorn ............. 380/4 |
| 5,146,575 A |   | 9/1992 | Nolan, Jr. |
| 5,224,166 A |   | 6/1993 | Hartman, Jr. |
| 5,343,524 A |   | 8/1994 | Mu et al. |
| 5,666,411 A | * | 9/1997 | McCarty ........................ 380/4 |
| 5,734,908 A | * | 3/1998 | Chan et al. .................. 395/709 |

(List continued on next page.)

OTHER PUBLICATIONS

Microsoft Press Computer Dictionary 3rd ed. pp. 312–313.*
MicroSentinelIUX®, Securing the future of software—Developer's Guide, Rainbow Technologies, Irvine, CA 1992–1993; 195 pages.

(List continued on next page.)

Primary Examiner—Gilberto Barron
Assistant Examiner—Douglas J. Meislahn
(74) Attorney, Agent, or Firm—Gates & Cooper LLP

(57) ABSTRACT

A method and apparatus for protecting computer software from unauthorized execution or duplication using a hardware key is disclosed. The apparatus comprises a means for communicating with the computer to receive command messages from the computer in the hardware key and to provide response messages to the computer, a memory for storing data for translating command messages into response messages enabling software execution, and a processor coupled to the interface port for translating command messages into response messages using the data stored in the memory. The processor further comprises a memory manager, for logically segmenting the memory storing the data into at least one protected segment, and for controlling access to the protected segment.

5 Claims, 11 Drawing Sheets

U.S. PATENT DOCUMENTS

| | | | | |
|---|---|---|---|---|
| 5,742,512 | A | * | 4/1998 | Edge et al. .................... 702/57 |
| 5,754,646 | A | * | 5/1998 | Williams et al. ................ 380/4 |
| 5,754,761 | A | * | 5/1998 | Willsey ....................... 395/186 |
| 5,812,662 | A | * | 9/1998 | Hsu et al. ....................... 380/4 |
| 5,883,956 | A | * | 3/1999 | Le et al. ......................... 380/4 |
| 5,915,017 | A | * | 6/1999 | Sung et al. ..................... 380/3 |
| 5,970,143 | A | * | 10/1999 | Schneier et al. .............. 380/23 |
| 6,266,416 | B1 | | 7/2001 | Sigbjørnsen et al. |

OTHER PUBLICATIONS

D. Everett, Computer Bulletin, Publication of The British Computer Society, Mar. 1985.

NetSentinel®: Securing the Future of Software—Deveoper's Guide, Rainbow Technologies, Inc., Irvine, CA, 1990–1992, (see entire document).

SentinelScribe®: Software Security System—Developer's Guide, Rainbow Technologies, Inc., Irvine, CA, 1990 (see entire document).

SentinelScout®: Software Security System—Developer's Guide, Rainbow Technologies, Inc., Irvine, CA, 1989, (see entire document).

EVE®: Software Security System—Developer's Guide, Rainbow Technologies, Inc., Irvine, CA, 1989–1990, (see entire document).

Sentinel C–Plus®: Securing the Future of Software—Developer's Guide, Rainbow Technologies, Inc., Irvine, CA 1991, (see entire document).

SentinelShell®—User's Guide, Rainbow Technologies, Inc., Irvine, CA, 1989, (see entire document).

Sentinenel Pro®: Securing the Future of Software, Rainbow Technologies, Inc., Irvine, CA, 1990, (see entire document).

* cited by examiner

HOST COMPUTER / HARDWARE KEY INTERFACE

SOFTWARE PROTECTION DEVICE ARCHITECTURE

MEMORY ADDRESS SPACE

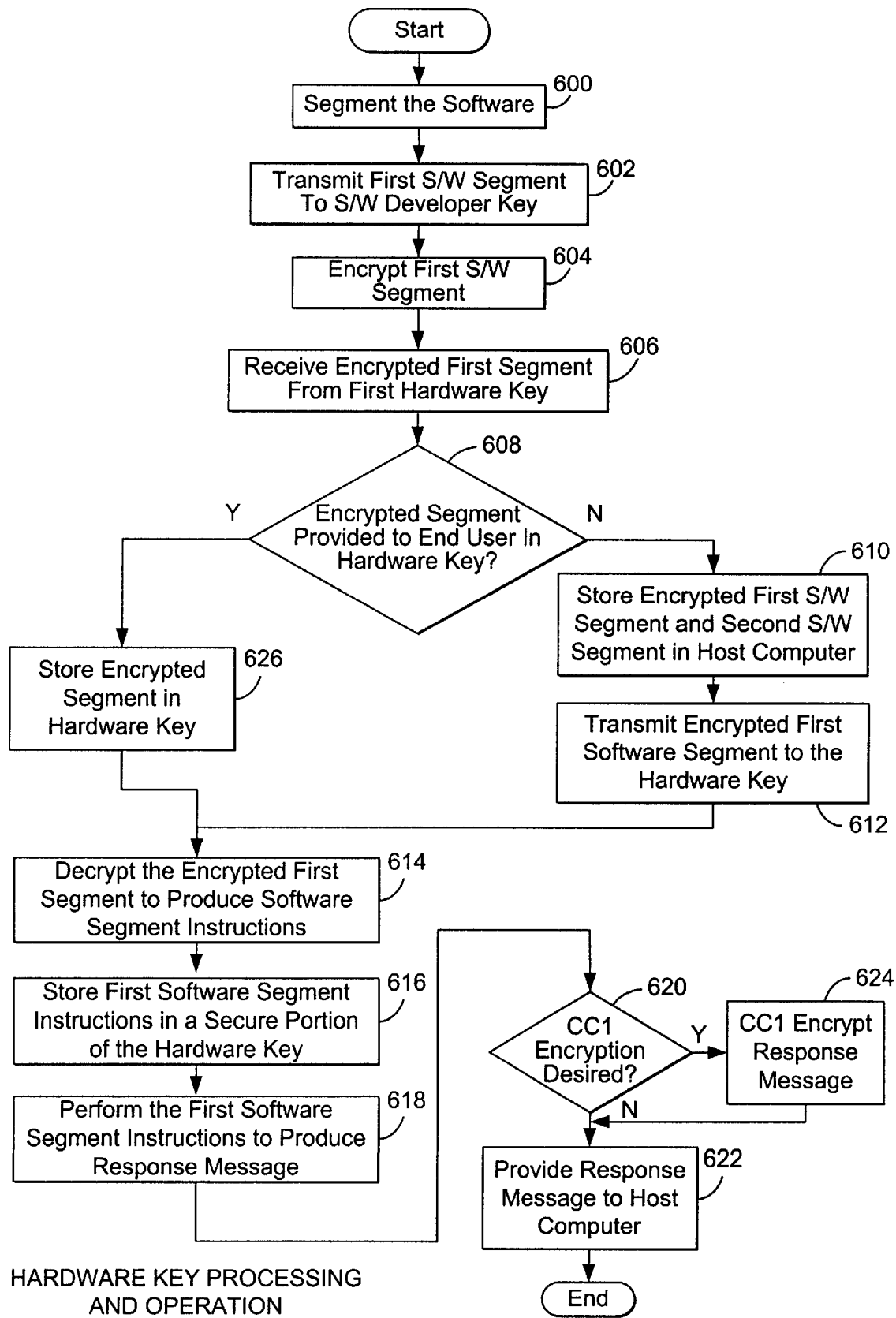
FIG. 9 — HARDWARE KEY PROCESSING AND OPERATION

SOFTWARE PROTECTION DEVICE AND METHOD

BACKGROUND OF THE INVENTION

1. Field of Invention

The present invention relates generally to devices and methods for protecting computer software and in particular to devices and methods for protecting software by secure transmission and execution of encrypted software in a hardware key.

2. Description of Related Art

In the last decade, the use of computers in both the home and office have become widespread. The growing use of computers has resulted in extensive unauthorized use and copying of computer software, costing software developers substantial revenue. Although unauthorized copying of computer software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device called a hardware key, or "dongle," coupled to an input/output (I/O) port of the host computer. One such device is disclosed in U.S. Pat. No. 4,599,489, issued to Cargile on Jul. 8, 1986. The Cargile device executes a prescribed algorithm to produce a code which the computer receives and affords access to the software code if the code is correct. Another such device is disclosed in U.S. Pat. No. 4,446,519, issued to Thomas on May 1, 1984. This system also uses a hardware key coupled to the I/O port of a host computer. Software locks inserted into unprotected software programs cause the host computer to transmit a code to the hardware key. The hardware key processes the code to generate a response message. The software lock receives the response message, and compares the response to the expected response. If the received response is as expected, execution of the software is permitted to continue. If not, execution is terminated. A similar device is shown in U.S. Pat. No. 4,458,315, issued Jul. 3, 1984 to Uchenik.

Devices such as those disclosed in the Thomas and Uchenik references are not impervious to software piracy. Computer hackers can interrogate the dongle/host computer interface to determine query/response pairs, and could emulate the presence of a dongle with non-approved devices or software. In addition, computer hackers can obtain access to the protected software, find the software locks, and simply patch around them.

One solution to this problem is to perform selected software instructions in a secure hardware key, as disclosed in U.S. Pat. No. 4,634,807, issued Jan. 6, 1987 to Chorley et al. The Chorley device allows execution of portions of the protected software in a secure dongle coupled to a host computer I/O port. In the Chorley device, portions of the unprotected software, called software modules, are encrypted by a data encryption standard (DES) algorithm, producing a DES key and an encrypted module. The DES key is again encrypted, using a private/public encryption technique. The private key needed to decrypt the DES key is stored in the dongle. When the host computer requires execution of the software module, the encrypted software is transmitted to the secure dongle, and stored in its memory. The dongle processor decrypts the DES key using the private key, and uses the DES key to decrypt the software module. The software module is then stored in unprotected memory, where it can be operated on by a processor within the dongle. Access to the private and DES keys is controlled by a switch means which allows the dongle processor to access the memory in which the keys are stored only when the hardware key is initially activated. Upon activation, the private key is used to decrypt the DES key, and the DES key is used to decrypt the software module. Thereafter, the switching means prevents the dongle processor from accessing these keys.

While the Chorley device makes unauthorized access to the keys by the dongle processor difficult, it also prevents authorized access at any other time, and does not allow the memory in which the keys are stored to be used for other purposes. Also, the Chorley device is still not impervious to software piracy, because the unencrypted software module is eventually stored in the hardware key in an unprotected memory, where it can be accessed by the host computer. This may be prevented by enforcing encrypted and decrypted communications between the host computer and the dongle, such as disclosed in U.S. Pat. No. 4,596,898, issued on Jun. 24, 1986, to Permmaraju or U.S. Pat. No. 4,864,494, issued on Sep. 5, 1989, to Kobus, but this cannot be implemented with the Chorley device, because access to the keys is temporally limited.

Additional software protection devices are disclosed in U.S. Pat. No. 4,817,140, issued Mar. 28, 1989 to Chandra et al., and in U.S. Pat. No. 5,146,575, issued to Nolan et al. The Chandra and Nolan devices use a physically and logically secure co-processor to decrypt and execute software. Encryption and decryption keys and the algorithms using these keys are stored in the device in a secure non-volatile random access memory (RAM). Unlike Chorley, unauthorized access to plaintext software and the encryption/decryption keys is prevented by firmware-implemented functions rather than by a hardware switch. However, the Chandra and Nolan devices have practical limitations which limit their usefulness to prevent software piracy. First, the ultimate security of software protected by the Chandra and Nolan devices relies on the secrecy of a set of co-processor supervisor keys (CSKs) which must be pre-stored in all co-processors supplied by a given hardware vendor, and requires that the eventual software customer employ a use-once token cartridge to configure the co-processor to operate the protected software. The Chandra and Nolan devices also do not permit flexible access to other portions of the RAM which do not contain sensitive data. Because the Chandra device must be usable with a wide variety of software applications, it must employ an "open architecture," and to prevent unauthorized access to sensitive information, is incapable of acquiring and transferring the right to execute the protected software. The Nolan device solves this problem by using a separate supervisor processor to implement a privilege structure and an open-architecture application processor to implement security functions. However, using two separate processors unnecessarily complicates the design and provides the potential software hacker with more opportunities to circumvent the software protection schemes employed in the device. The Nolan and Chandra devices are not immune from hacking by monitoring the co-processor/host interface, and using this data to emulate the hardware key.

Another problem with current software protection devices is that they are not backwards-compatible, and are not flexible enough to implement a wide variety of software protection algorithms within a single hardware key. For example a single host computer may store two separate software applications, the first protected with simple software locks, such as those described in the Thomas patent, and the second protected with encrypted computer/hardware key communications. Prior art software protection devices are incapable of supporting both of these software protection schemes, and two hardware keys would be required.

SUMMARY OF THE INVENTION

To overcome the limitations in the prior art described above, and to overcome other limitations that will become apparent upon reading and understanding the present specification, the present invention discloses a method and apparatus for protecting software executable on a computer.

The apparatus comprises a hardware key with a communicating means coupled to the computer for receiving command messages and providing response messages to the computer, a memory for storing data used in translating command messages into response messages to enable execution of software on the computer, and a processor coupled to the communicating means and the memory. The processor includes a means for interpreting command messages to generate processor command functions, a translator for generating response messages from the processor commands, and a memory manager to protect data from unauthorized access. The memory manager logically segments the memory into at least one protected segment and controls access to this protected segment. This is accomplished with an instruction mapper which selectively maps processor commands to memory address locations. The hardware key also employs a means for decrypting coded software and performing the decrypted instructions, and supports encrypted communications between the hardware key and the host computer. Additional capabilities are provided by programming interface module, command class dispatcher, and a license manager. The programming interface module allows secure programming of the hardware key without compromising its contents. The command class dispatcher provides for backwards compatibility of the present invention with other software protection devices. The license manager allows a software developer to use the hardware key to implement secure licensing schemes.

The present invention also discloses a method of securing executable software. The method comprises the steps of segmenting the software into a first and second software segment, transmitting the first segment to a first hardware key (the software developer's hardware key), encrypting the first software segment in the first hardware key, and receiving the encrypted software segment from the hardware key. Because the keys used to encrypt the first software segment are securely stored in the software developer's hardware key, they remain protected from unwanted disclosure. The encrypted segment can be stored in a magnetic medium along with the second (unencrypted) software segment or in a second hardware key that is provided to the software end-user.

BRIEF DESCRIPTION OF THE DRAWINGS

Referring now to the drawings in which like reference numbers represent corresponding parts throughout:

FIG. 9 is a flow chart illustrating the hardware key programming aspects of the present invention.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is understood that other embodiments may be utilized and structural changes may be made without departing from the scope of the present invention.

Overview

The present invention provides a high degree of security and flexibility to protect software in both stand-alone and networked applications enabling users to develop a single security strategy, using a common Application Program Interface (API) for both stand-alone and networked applications across all platforms. It features a cross-platform API, allowing software developers to easily port software across a wide variety of platforms. The present invention supports all current parallel printer ports, RS-232 and RS-423 serial ports, and Macintosh™ Apple Desktop Bus (ADB) ports, thus providing for product interoperability and local or remote access across a network. The present invention also permits flexible secure licensing schemes and tools for system administrators for networked applications.

Figure 1:
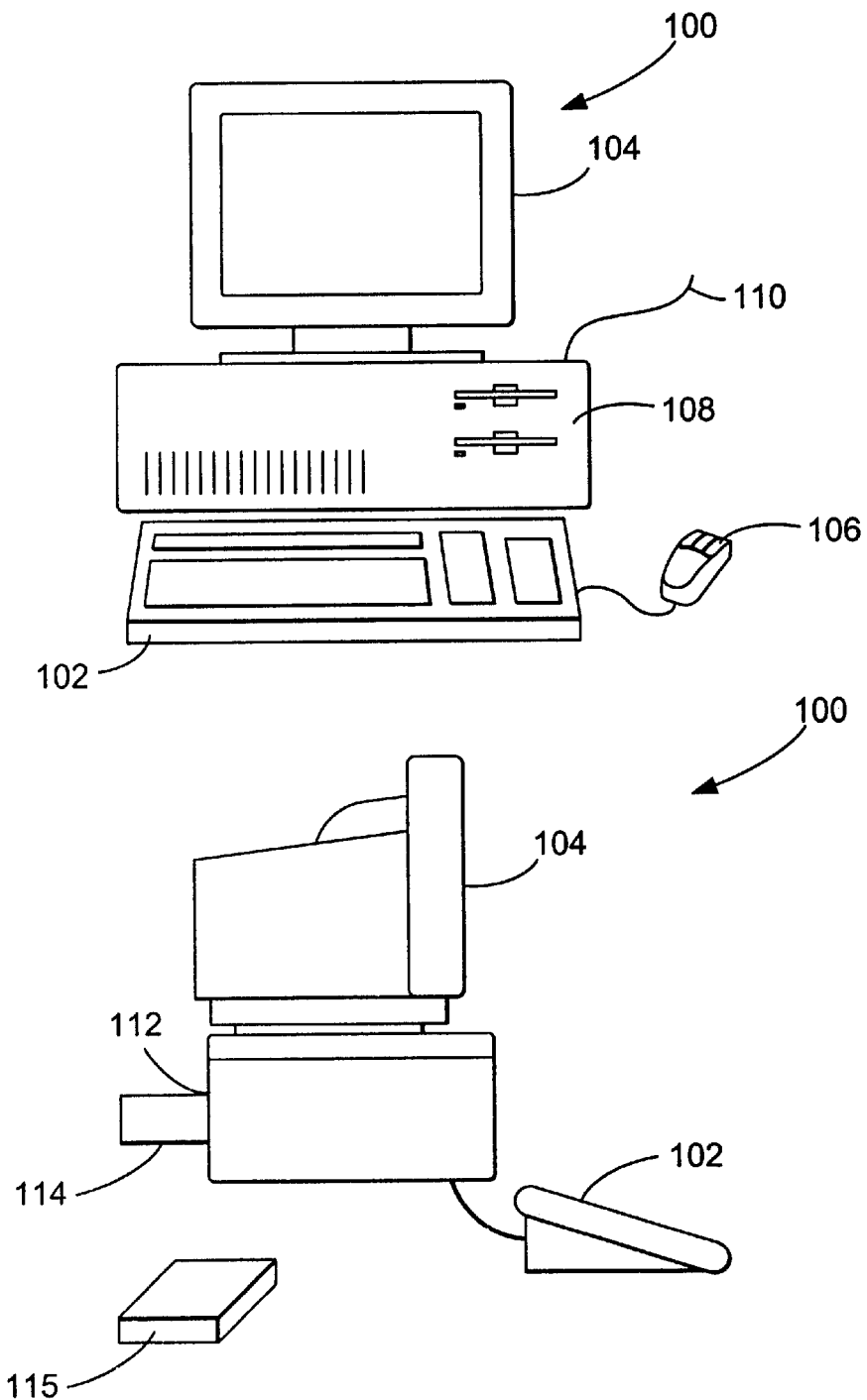
FIG. 1 is a diagram showing the interface between a host computer and the present invention.

As shown in FIG. 1, the present invention is used in conjunction with a host computer 100. The host computer 100 may include a keyboard 102, display 104, a mouse 106 and an external storage device 108. The host computer 100 may be networked with other computers via an external communications link 110. A hardware key, or dongle 114, is coupled to the host computer 100 via an I/O port 112.

System Architecture

Figure 2:
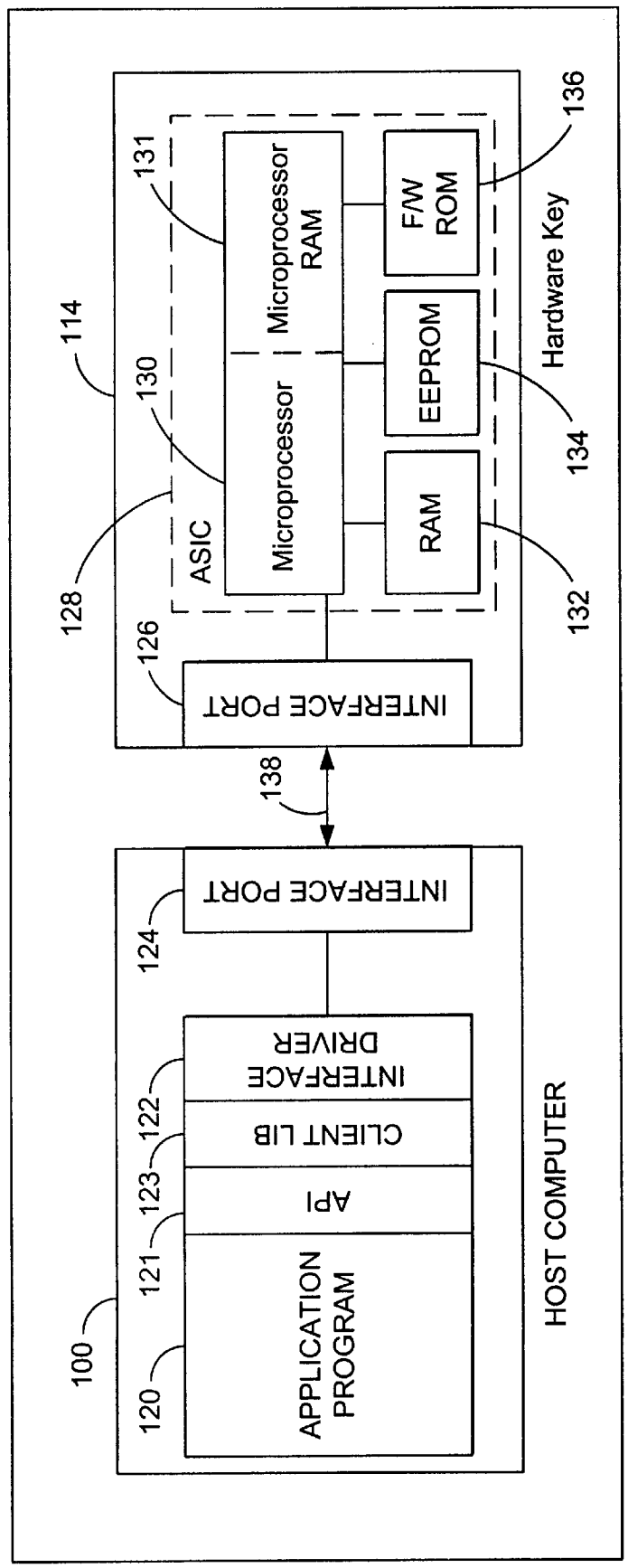
FIG. 2 is a block diagram describing the overall architecture of the present invention.

FIG. 2 presents a block diagram describing the overall architecture of the present invention. The host computer 100 is coupled to a hardware key 114 providing a host computer/hardware key communications link 138. This communications link may be any computer I/O link, including a parallel printer port, an RS-232 or RS-423 serial port, a Macintosh™ ADB port, or any port used for remote or network communications.

The host computer 100 responds to the instructions in one or more application programs 120 to process data and provide output results. The present invention prevents unauthorized use or copying of application programs 120 in the host computer 100, or any other processor coupled via the external communications link 110. Application programs 120 communicate with the hardware key 114 via an application program interface 121 (API), client library 123, and an interface driver 122.

The hardware key 114 includes a custom designed application-specific integrated circuit (ASIC) 128. The ASIC 128 is coupled to the host computer 100 via the hardware key interface port 126 and host computer/hardware key communications link 138. ASIC 128 contains a microprocessor 130, and associated microprocessor RAM 131, a firmware read only memory (F/W ROM) 136, random access memory (RAM) 132 and a developer-configurable electronically erasable programmable read only memory (EEPROM) 134. Of course, EEPROM 134 can be replaced by any programmable non-volatile memory technology, including anti-fuse read only memory technologies. These anti-fuse technologies offer one-time write capability and do not allow external inspection of data bit states. Co-locating these elements in a single ASIC 128 allows critical security-related values to be stored in memories such as the EEPROM 134 which are difficult to penetrate from outside the chip.

Figure 3:
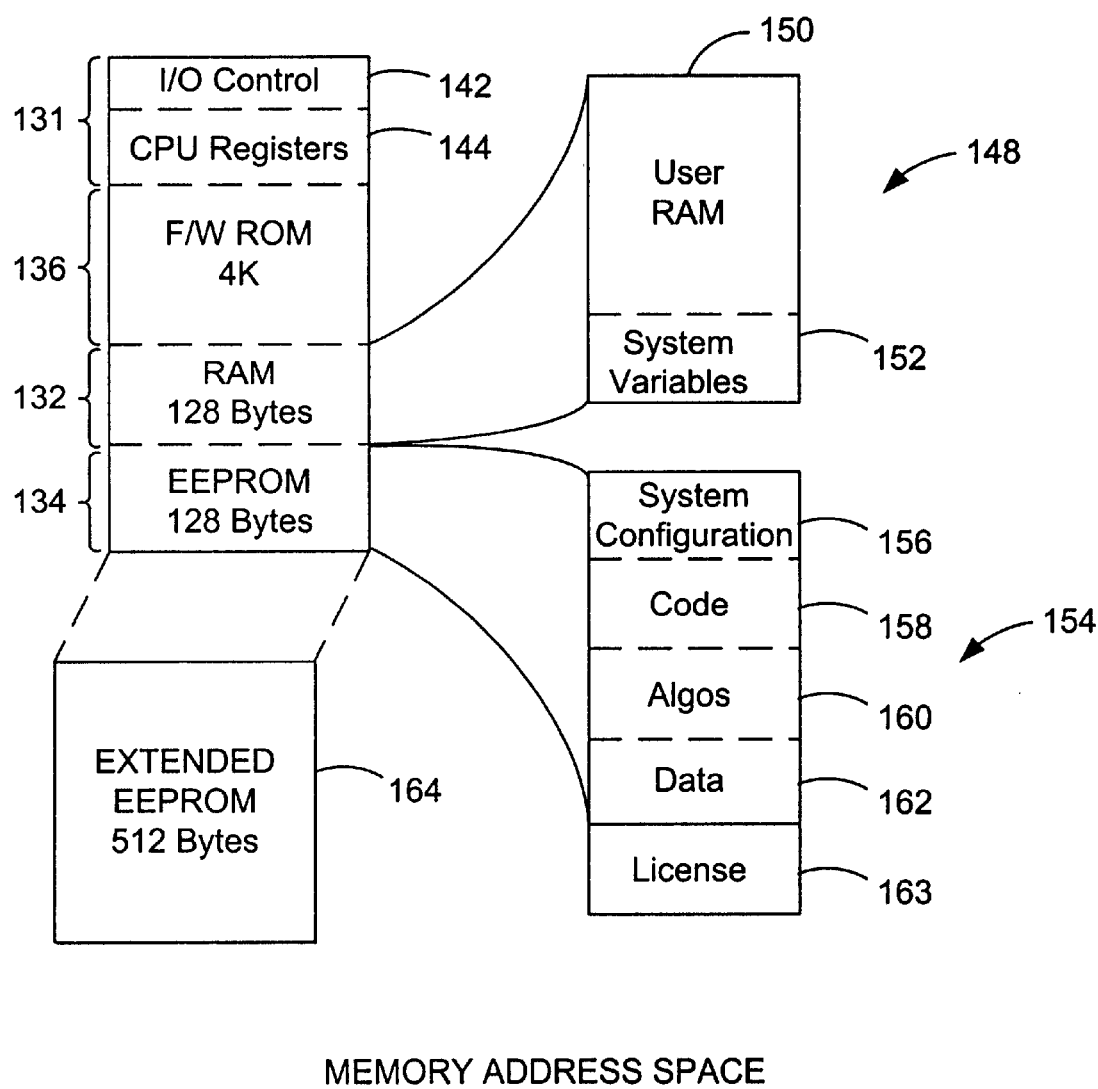
FIG. 3 is a diagram describing the memory structure for the present invention.

FIG. 3 presents a diagram of the memory of the hardware key 114. Microprocessor RAM 131 includes input/output control address space 142 and CPU register address space 144. Instructions contained in the I/O control address space 142 are always available to respond to messages transmitted over the host computer/hardware key communications link 138. F/W ROM address space 136 includes modules with instructions to implement the present invention. The operation of these modules is described in more detail herein.

RAM address space 148 includes a user RAM address space segment 150, and a system variable address space segment 152. The user RAM address space segment 150 is available to software developers for data storage or execution of pre-compiled programs. RAM 132 may also be used as a buffer for incoming/outgoing data from and to the host computer. It also contains a stack for variable, expression evaluation, function addresses and system temporary data.

EEPROM address space 154 is segmented into a system configuration address space 156, a code address space 158, an algorithm address space 160, a data address space 162, and a license address space 163, in which user/developer program instructions, algorithms, data, and license information, respectively, may be stored. The present invention also provides for extended EEPROM 164. As will be described herein, access to segments of the EEPROM 134 are controlled by a memory manager 318, thereby preventing unauthorized access to data stored in EEPROM 134. A portion of EEPROM address space 154 can also be configured by the developer for code 158, algorithms 160, data 162, or license information 163. The EEPROM 134 can be programmed at development time or with APIs 121 during run-time. Similarly, although address space limits are generally preconfigured, APIs 121 are also available to configure the code 150, algorithm 160, data 162, and license information 163 address space limits during run-time. This provides additional flexibility to the programmer to implement software security techniques, to allocate memory as required for each security technique, and to support field updates. Routines may be stored in the EEPROM 134 to be interpreted and executed by the hardware key 114 during run-time, or the routines can be encrypted during development and downloaded and executed during application run-time.

In one embodiment, the hardware key 114 includes 4,096 instructions of F/W ROM 136, 128 bytes of RAM 132, and 128 bytes of the EEPROM 134 with 90 bytes of EEPROM 134 customer-configurable. External EEPROM 164 may also be coupled to the ASIC 128 to provide additional memory for code, data, or algorithms.

System Communications

Figure 4:
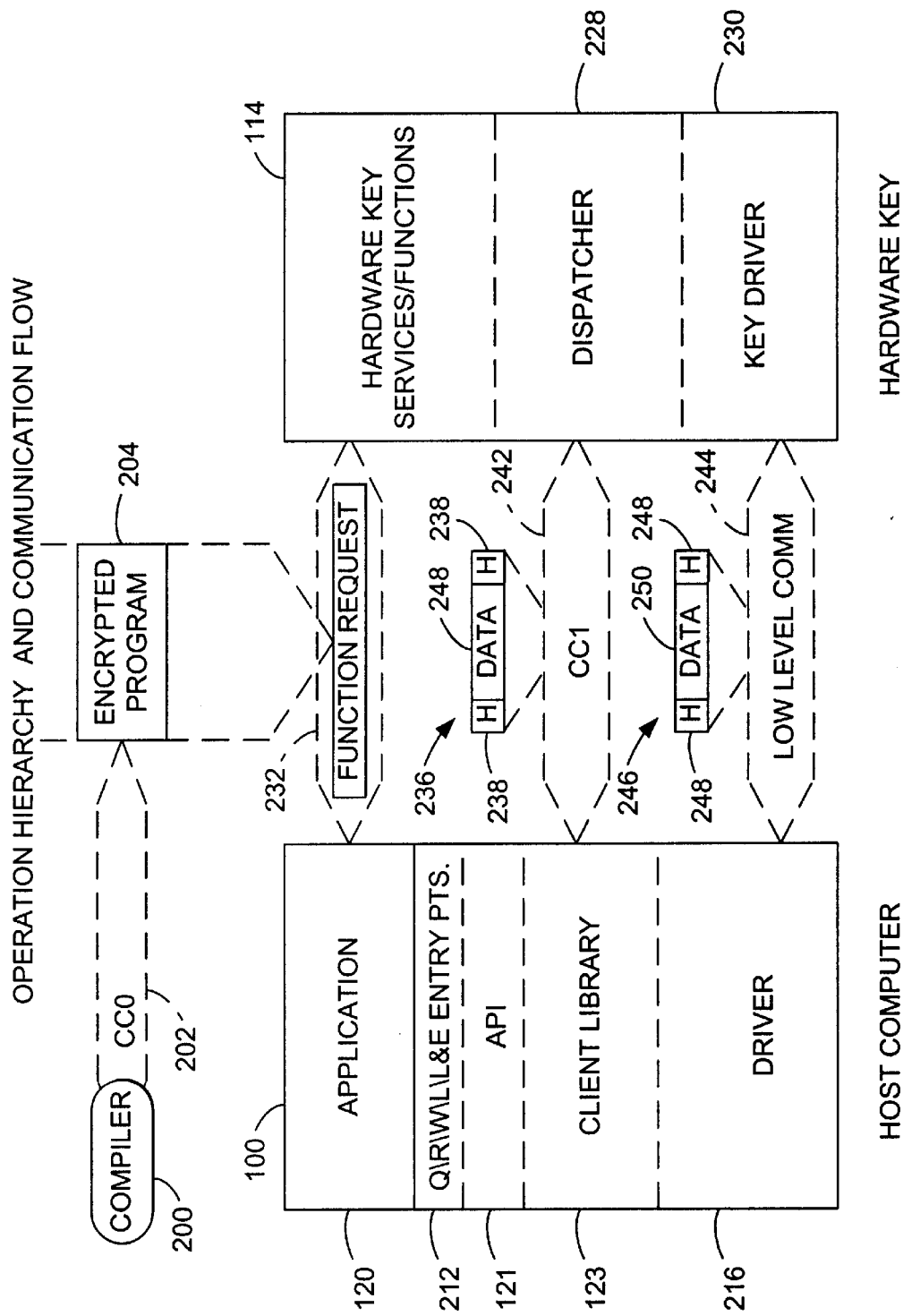
FIG. 4 is a diagram showing the operation hierarchy and communication flow of the present invention.

FIG. 4 presents a diagram showing the operation hierarchy and communication flow of the present invention. The software developer protects the software by embedding API calls 212 in the application. These calls may include functions to query information from the hardware key 114, read or write data to/from the hardware key 114, or load and/or execute programming in the hardware key 114. Although APIs 121 need not be language-specific, multiple language-specific APIs 121 are provided to accommodate various development languages and techniques.

The client library 123 translates API 121 calls into hardware key 114 commands. These commands are then sent from the client library 123 to the driver 216 and from the driver 216 to the hardware key 114. The client library 123 also implements dynamic, or message (CC1) encryption when required, and constructs data packets for the hardware key 114.

The driver 216 can be linked either statically or dynamically with the application program to be protected or used as a system driver. The driver 216 implements low-level communications 244 between the host computer 100 and the hardware key 114. The driver 216 also provides support for the client library 123 to find a device, transfer a data packet, or obtain a response message from the hardware key 114.

Communications between the host computer 100 and the hardware key 114 operate as an open systems interconnection (OSI) module using a layered architecture divided into three hierarchical levels corresponding to three command types. This communication architecture provides a peer-to-peer link or virtual path between the indicated layers.

The lowest hierarchical layer provides the sole physical communications link between the host computer 100 and the hardware key 114, linking the driver 216 with the low level hardware key driver 230. This communications link is depicted as the low level communication path 244. Key control functions, which are unencrypted, are transmitted via the low level communication path 244, and are processed by the low level hardware key driver 230 directly.

Other communication layers, including the high level virtual communication path 232 and the mid-level virtual communication path 242 discussed below, use the low-level communication path 244. Of course, the present invention could be implemented with a two-level communication architecture, or other levels in addition to the three described above. The client library 123 and the driver 216 build the appropriate command format with parameter packets for each individual command. Each parameter packet is specific to the individual API function call. The APIs 121 also use a session buffer in a designated system memory area to hold parameter blocks for function requests.

Memory and command management functions are transmitted between the host computer 100 and the hardware key 114 at the medium-level virtual communication path 242 using a dynamic (CC1) encryption algorithm. Memory and command functions and other selected messages are encrypted with the CC1 encryption algorithm and key, and passed as packets from the host computer 100 along the mid-level virtual communications path 242. These packets are then decrypted and processed in the hardware key 114 using the CC1 decryption key stored in the hardware key 114. A CC1 key is stored in the client library 214 and in a secure portion of the hardware key 114. The size of the CC1 key is determined by the level of protection desired.

Programmatic functions including transfer of encrypted software modules representing selected portions of the application to be protected are communicated between the host computer 100 and the hardware key 114 at the highest level virtual communications path 232. Programmatic functions are normally pre-encrypted by the software developer during development using compiler 200 and CC0 encryption key 202. Encrypted program packets are either downloaded to the hardware key 114 along the high level virtual communication path 232 during run-time to be decrypted and executed by the firmware in the hardware key 114 or pre-loaded in EEPROM 134 and interpreted during run-time. As with the CC1 key, the size of the CC0 key depends on the level of security desired.

FIG. 4 also shows the structure of the low level and medium level virtual communication data packets 246, 236. Each includes a header 238 and 248.

The separate CC0 and CC1 encryption mechanisms provide secure communications to allow a software developer to use the hardware key 114 to (1) locate and verify the existence of the hardware key 114, (2) read/write/query the key, using algorithms and traps, or (3) execute pre-encrypted programs or subroutines during application run-time in a manner that prevents recognition of algorithms, commands, or responses.

System Functions

Protected applications 120 access the hardware key 114 through one or more security sessions using API 121 functions. API 121 functions are typically written in the same language as the application, but may be written in other languages and implemented by dynamic linking. API 121 functions include:

| | |
|---|---|
| INITIALIZE | Initializes client library data structures and prepare library for calls, each session requires an initialized command. |
| CONFIGURE | Determines behavior about the client library 123, the hardware key 114, or the linked-in driver 216. |
| OPEN | Establishes a session for the application, and search for an I/O port 112 with the hardware key 114. |
| ACCESS | Submits a query/read/write/modify request, download a program or traps, or reset the hardware key 114. |
| INQUIRY | Returns status and configuration information about a session. |
| CLOSE | Closes a session created by "OPEN". |
| TERMINATE | De-initializes the client library 123 and prepare for termination. |

The CLOSE and OPEN functions are known as A-subclass commands and are transceived through the low level communication path 244. These functions require no encryption and are used for general management of the hardware key 114.

API 121 functions for memory and command management are known B-command class commands. These functions employ the dynamic encryption algorithm (CC1 encryption key) and the medium-level virtual communication path 242 and are used for encrypted communication during the running of a protected application. They are submitted to the hardware key 114 with the "access" API and appropriate parameter packet. Memory and command management functions include the following:

| | |
|---|---|
| READ | Reads one or more adjacent cells. |
| WRITE | Writes into one or more adjacent cells. |
| QUERY | Scrambles data with a designated algorithm descriptor. |
| IOXCHG | Changes data by the associated procedural trap. |
| SET/GETLimits | Define data/code limits in hardware key 114 EEPROM 134 for use in session. |

API 121 functions also include programmatic functions known as C-command class commands. These functions are used to execute programs encrypted by a compiler 200. Execution of these programs requires a CC0 encryption key. These functions are submitted to the hardware key 114 with the "access" API and program packets. These programmatic functions include:

| | |
|---|---|
| LOADCONTEXT | Loads a set of traps and procedures into the EEPROM 134. This function operates on context data objects which contain both code and trap descriptors encrypted with the CC0 key. This function also stores code that is callable by the LOADEX command. |
| SETALGO | Defines a new query algorithm descriptor. |
| LOADEX | Runs codes, which was encrypted during development, in RAM 132. |

System Operation

Figure 5:
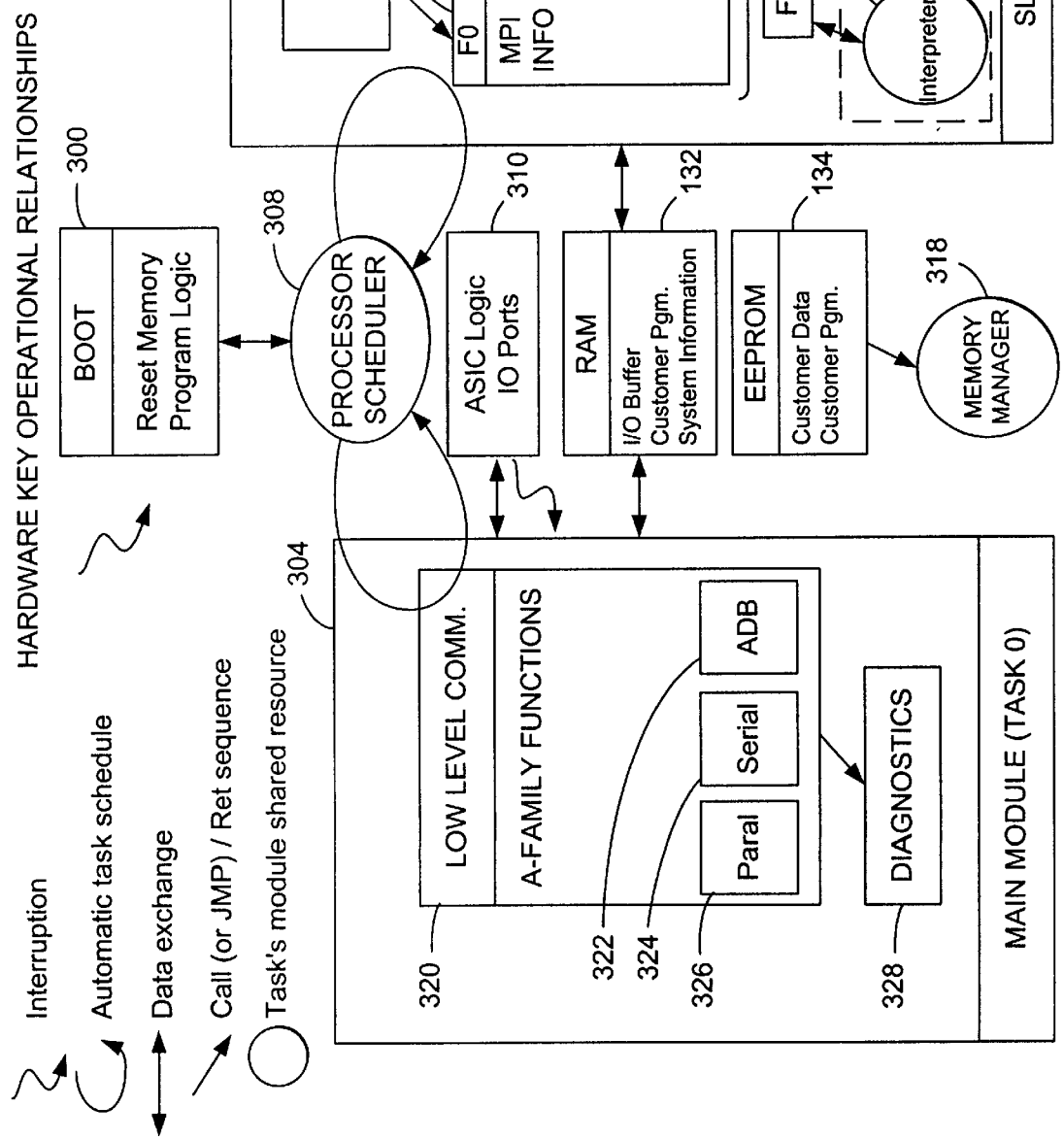
FIG. 5 is a diagram showing the operational relationships between elements of hardware key of the present invention.

FIG. 5 is a diagram showing the operational relationships between elements of the hardware key 114. Block 300 represents the boot module, which performs power-up or re-boot operations. The boot module 300 initializes the hardware key 114 system RAM and provides a startup reference for the program logic.

The microprocessor 130 is configured to run in a time-sliced manner, so that two separate tasks can run in the device simultaneously. The processor scheduler 308 contains logic required to implement these operations in the microprocessor 130. The main module 304 handles communications between the hardware key 114 and the host computer 100 or any other device to which the hardware key 114 is coupled via I/O port 112. The main module 304 operates in real time to monitor signals entering the hardware key 114 and is capable of controlling the processor scheduler 308 to effectively transfer information to the slave module 306. The main module 304 therefore can operate to monitor all central processing unit (CPU) cycles of the host computer 100, running as fast as possible.

Low level communication module 320 handles the low level communication functions previously described. The low level communication module 320 provides separate submodules to interface with a variety of I/O ports 112 including a parallel port submodule 326, a serial port submodule 324 and an Apple™ Desktop Bus (ADB) submodule 322. Of course, modules for other I/O ports such as a smart card or PCMCIA interface may be implemented.

Further provision is made for diagnostics of the low level communication module 328. Data is transferred to the slave module 306 via RAM 132. The main module 304 transfers data available on the I/O port 112 from and to the slave module 306 via the RAM 132.

A RAM status bit is separately allocated within the RAM 132. This RAM status bit provides information to the main module 304 as to whether the slave module 306 is currently operating on a request, so that further requests can be rejected until a response from the slave module 306 has been provided and delivered. If the slave module 306 is not busy working on a request, the RAM status bit notifies the slave module 306 that it has a data packet to work on. These operations are controlled by the ASIC logic module 310. The RAM 132 therefore operates as an I/O buffer which works cooperatively with the processor scheduler 308 to transfer data to and from the main module 304 and the slave module 306.

The slave module 306 performs a number of functions, a subset of which are organized into a number of command class modules. The command class dispatcher 330 directs hardware key 114 communications to the command class module as directed by an indicating value stored in the data packet. The command class module orientation of the slave module allows the creation of special firmware to do special purpose processing for different software developer customers.

The slave module 306 also comprises shared services which can be accessed by any of the command class modules. The encryption module 348 performs encryption functions as required by the B-command class and the C-command class functions processed by Block 340. These functions decrypt communications and/or code as required for the B-command class or C-command class commands using the CC0 and CC1 encryption-decryption keys stored in secure portions of EEPROM 134. The interpreter 344 steps through decrypted or unencrypted code to perform the functions indicated by the code and translates the results into response messages. The query engines 346 are accessed by the command class modules to perform queries. For example, if a B-command class command is sent from the host computer 100 to the hardware key 114, the low level communications module 320 and the main module 304 receive the message. This message includes header information sufficient to identify it as a B-command class command. If the RAM status bit indicates that the slave module 306 is not busy with another request, the low level communication module 320 accepts this message which it loads in RAM 132. Using the header information, the command class dispatcher 330 identifies the messages as a B-command class command, and supplies the command to the B-C command class module 340. The B-C command class module 340 then accesses the slave module shared services 342 to perform the functions indicated via the command class dispatcher 331. If the message was encrypted with a CC0 key, the encryption module 348 is used to decrypt the message. If the message included an encrypted portion of the application software, this is also decrypted by the encryption module 348. Decryption of both the message and the application software portion is accomplished by the encryption module 348 using the CC0 key and the CC1 key which are securely stored in the EEPROM 134. The B-C command class module 340 then uses the interpreter 344 to perform the indicated functions.

The query engine module 346 supports the query/response operations of the B-C command class module 340.

The query engines in the query engine module 346 provide an important feature of the present invention because they allow internal information such as algorithm descriptors to be verified without revealing the information itself, and can also be used for authentication purposes.

The query engine provide hardware key 114 responses to challenges from the host computer 100. The challenge or query can be either a descriptor based query, or a non-descriptor based query. In both cases, the query engine calculates a response (transformed data stream) to a challenge (an input data stream).

The response to a non-descriptor based query depends on the challenge value alone. Accordingly, query engine algorithms are selected to be sufficiently complex as to prevent challenge/response pairs from revealing the underlying query engine algorithms.

The response to a descriptor based query depends both on the challenge and a descriptor. The challenge is supplied by the application software program and can be any value. The descriptor consists of two portions: a software user/developer supplied portion and a portion which is supplied by the hardware key 114 vendor. To provide software developer dependency, the descriptor portion supplied by the hardware key 114 vendor includes software developer hardware key 114 specific information.

The query engine module 346 can also be made more secure by setting up traps to further confound a potential software hacker. Traps allow a software developer to redefine the requested functions, introducing another element of confusion to prevent probing the hardware key 114 to determine how it operates. For example, the query engine 346 can be configured to respond to a query request by storing a value in an EEPROM 134 cell rather than by returning a response value as would otherwise be expected.

Block 338 is a hardware key emulator module. This provides for backward-compatible emulation of a wide variety of hardware keys. For example, prior art hardware keys did not utilize encrypted messages from the host computer 100 to the hardware key 114. The hardware key emulator module 338 allows the communication encryption functions to be bypassed, allowing the hardware key 114 to be backward-compatible with prior art hardware keys, which do not operate with encrypted communications. Backwards-compatibility with other existing hardware keys can be similarly implemented.

The slave module 306 also comprises a manufacturing programming interface (MPI) module 332, and a license manager module 334. The MPI module 332 is used to protect customer specific security data. This module provides two modes for two levels of MPI support. The first mode allows programming of algorithms and encryption keys in EEPROM 134 of the hardware key 114. The second mode allows software developers to program data into the hardware key 114. This capability allows software developers to personalize the hardware key 114 for their customers. Access to the first mode is protected by a challenge/response protection method implemented by the firmware of the hardware key 114. For further protection, the contents of the configuration area of the EEPROM 134 is erased whenever this mode is accessed, effectively rendering the hardware key 114 inoperative. This prevents any access to confidential information, even if the challenge/response method is circumvented.

The license manager command class module 334 is used to enforce multiple site license limitations. This allows security-related functions of host computer 100 operating as a security server to be implemented in the hardware key, reducing the vulnerability of the server to software hacking techniques. License manager command functions include:

| | |
|---|---|
| OPC_SRVRESET | Frees all licenses. This command is usually called after a server boot. |
| OPC_OPENLIC | Requests a base license from the key. Includes a transaction identification number (TRANS_ID) |
| OPC_GETCNTX | Passes a copy of the current license information to the server, including BOOT_ID, TRANS_ID, and LICNSNUM. These values are encrypted before being sent to the server. |
| OPC_SETCNTX | Reloads the license information back to the hardware key. |
| OPN_OPENSUB | Issued by clients, and opens a sublicense. Argument includes an application identification (APP_ID) and a debit number. |
| READ/WRITE/QUERY | These operations can be performed if a base license is open. Results from these operations are CC1 encrypted before being sent to the host. |
| OPC_CLOSESUB | Issued by clients, and releases used license. Includes (APP_ID) and credit number. |
| OPC_CLOSELIC | Issued by clients to release base license. |
| License manager command class module 334 variables include: | |
| HARDLIMIT | Maximum base license limit imposed by hardware key. If set to 0, allows a single user only. |
| SOFT_LIMIT | Maximum base license set by software developer |
| BASE_COUNT | Number of base licenses remaining. This is modified when the server is reset or when a base license is opened or closed. |
| APP_ID | Identification numbers for sublicenses. This is set by the software developer. |
| APP_COUNT | Number of sublicenses remaining. This is modified when the server is reset or when a base license is opened or closed. |
| BITMAP | Indicates whether license is open or closed. This is modified when the server is reset or when a base license is opened or closed. |
| BOOT_ID | This value is randomly selected when server resets. |
| TRANS_ID | Transaction identification set by the client. This value is modified when a base license is opened or when the SET_CNTX command is issued. |

Figure 6:
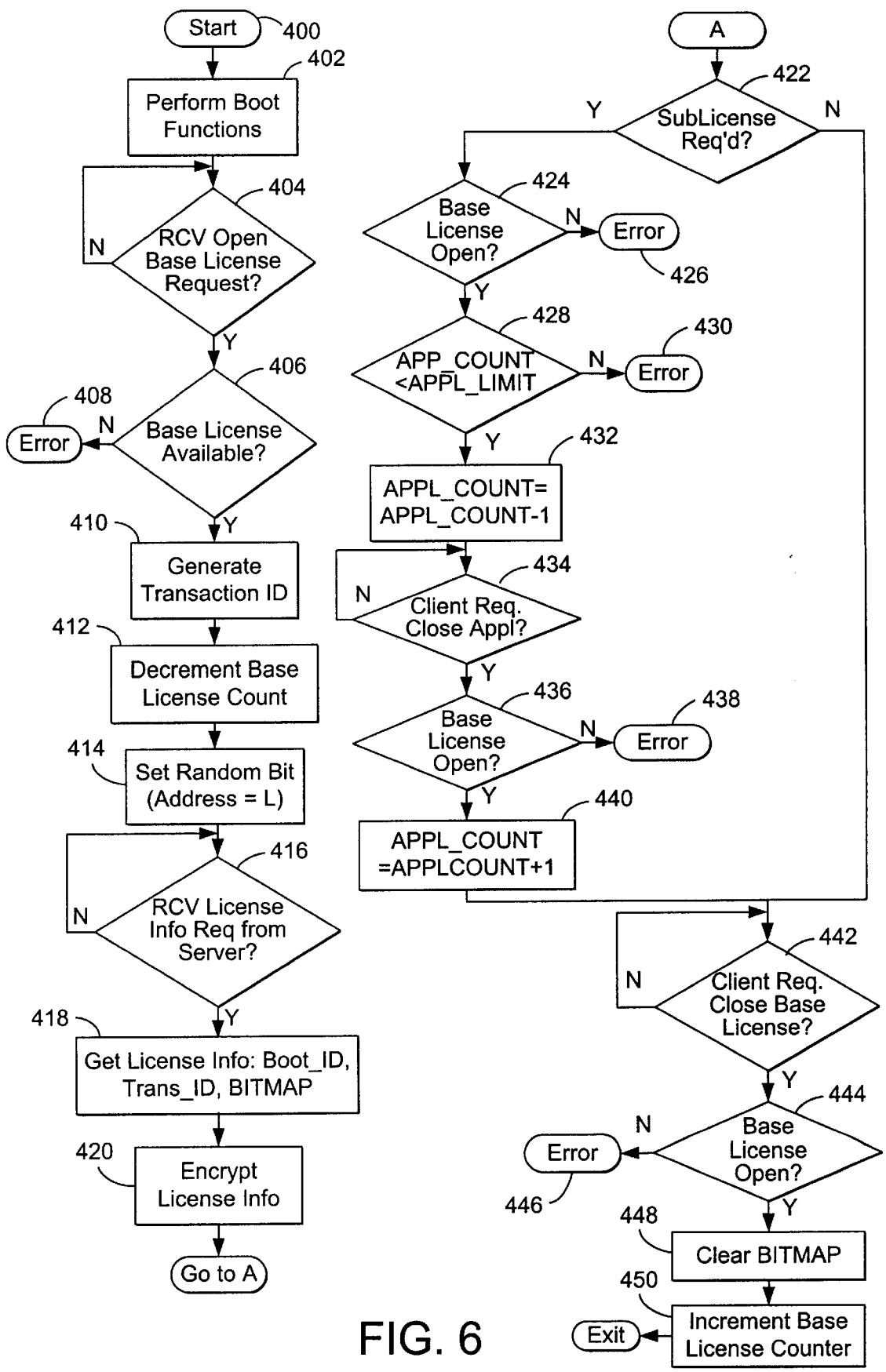
FIG. 6 is a flow chart illustrating the license management capabilities of the present invention.

FIG. 6 is a flow chart describing the operation of the license manager command class module. In block 402, boot functions are performed as a part of the server startup process. After locating and identifying network hardware keys 114 as a part of the startup process, the server issues an OPC_SRVRESET command. This invalidates any current license context, and generates a random value for BOOT_ID, which becomes the new session identification. Next, all bits in the BITMAP variable are cleared to indicate that there are no open licenses. Finally the values stored in APP_LIMIT and SOFT_LIMIT are stored in APP_COUNT and BASE_COUNT, respectively, indicating that all base licenses and sublicenses are available.

As shown in block 404, if a license is desired, the client issues and the hardware key 114 receives an OPC_OPENLIC command with a transaction identification number, TRANS_ID. Block 406 determines if a base license is available. If not, block 408 returns an error message. If at least one base license is available, block 410 changes the transaction identification and all encrypted results thereafter required this new TRANS_ID to receive data. Next, block 412 decrements BASE_COUNT, and block 414 sets a random bit in the BITMAP variable. The address of this bit is later passed to the server as LICNSNUM.

In block 416, the hardware key 114 determines if the server has requested license data by issuing an OPC_GETCNTX command. If so, as shown in block 418, the hardware key 114 responds by passing a copy of the current license information to the server. This information includes the BOOT_ID, TRANS_ID, and BITMAP values. In block 420, these values are encrypted before being sent to the server.

The present invention is capable of supporting a number of sublicenses. Any client can request one or more sublicenses for a particular application as long as a base license is already opened. Each sublicense has a unique ID (APP_ID) and a limit (APP_LIMIT) which is set by software developers. Block 422 determines whether the software developer has implemented a sublicense management scheme in the hardware key 114. If so, block 424 determines if a base license is open. If a base license is not opened, block 426 returns an error message. If a base license is open, block 428 finds the application identified by APP_ID and determines if the number of open applications (APP_COUNT) is less than the allowed number (APP_LIMIT). If so, block 432 decrements APP_COUNT. READ, WRITE, and QUERY operations can then be performed by a client with an open base license. The results of these operations are encrypted with CC1 encryption before transmission.

When a client no longer requires access to the licensed software, the client issues a OPC_CLOSESUB command to the hardware key. Block 434 checks for this command, and when it is received, block 436 checks to determine if a base license is open. If not, block 438 transmits an error message to the server. If a base license is open, block 440 increments the APP_COUNT value.

Block 442 responds to a OPC_CLOSELIC command from the client. When this command is received, block 444 checks to determine if a base license is open. Block 446 returns an error message if a base license is not open. If a base license is open, the corresponding bit of the BITMAP variable is cleared, and the BASE_COUNT value is incremented to indicate that another base license has become available.

Memory Manager

Figure 7:
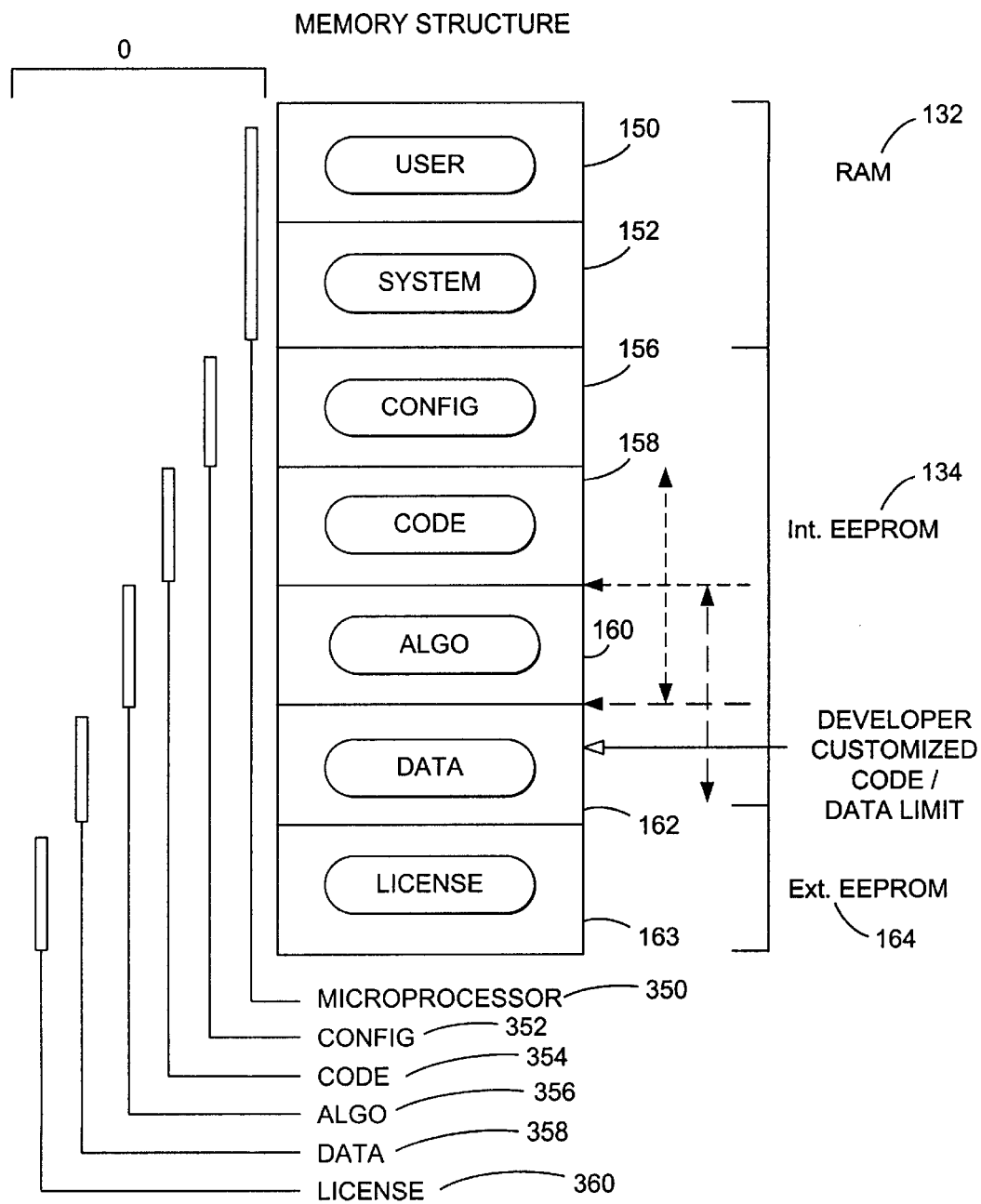
FIG. 7 is a diagram showing the memory structure implemented by the memory manager of the present invention.

As shown in FIG. 7, the memory manager provides several basic and compound virtual address spaces. These map three physical memory components: RAM 132, internal EEPROM 134 and external EEPROM 164. The memory manager module 318 uses the instructions in the F/W ROM 136 to abstract all storage to these virtual address spaces. Any changes to the size or type of memory used are thus localized and controlled by the memory manager 318. In order to access these virtual address spaces, the memory manager 318 exports a number of macros and a system variable zone, used for parameter passing.

The three physical memory zones are mapped into eight segments. These include the user RAM segment 150, the system RAM segment 152, the configuration segment 156, the program code segment 158, the algorithm segment 160, the data segment 162 and the license segment 163. The memory manager provides virtual address spaces for the configuration segment 156, the code segment 150, the algorithm segment 160, the data segment 162 and the license segment 163. The user RAM segment 156 and the system RAM segment 152 are mapped directly by microprocessor commands 350. Compound virtual address spaces are also included forming a continuous address space by concatenating two segment address space thresholds between the code segment 158 and the algorithm segment 160, as well as between the algorithm segment 160 and the data segment 162. In this way, the address space can be programmably configured.

To protect the CC0 and CC1 keys, the query engine module 386 algorithms information and for other security reasons, the configuration memory segment 156, the code memory segment 158 and the algorithm memory segment 160 are confined entirely to internal EEPROM 134. Further, all external EEPROM 164 is encrypted. In the preferred embodiment, simple encryption algorithms are utilized for external EEPROM 164 encryption. Complex algorithms would be slow and possibly involve several memory access to read/write a word of data. Complex encryption algorithms would perhaps be more secure, but its primary purpose is to prevent external EEPROM of one key working with a different key.

The memory manager 318 provides macros to access each virtual address space. Each virtual address space has two access macros, Rxxxx and Wxxxx where xxxx is name of the address space's name. Rxxxx reads a bit/word from the address space. Using these macros, the memory manager 318 therefore divides the total memory into different sections based on intended usage and provides read/write interfaces to the rest of the firmware for accessing each section. Through this mechanism sensitive areas of the memory are isolated from command functions that a computer hacker could possibly control.

In the case of the CC0 and CC1 encryption keys, these are stored in the configuration segment 156 of the EEPROM 134 and are accessed only through configuration read and write functions 352. These functions are used only by those firmware functions that are performing encryption and decryption and are not used by either the interpreter module 344 to access the memory on behalf of the program being interpreted, nor by the event handler when it is asked to read or write user data.

Operation

The present invention can be used by software developers to implement a wide variety of software protection schemes.

First, the software programmer can simply store application-specific data in the hardware key EEPROM 134, and use this data during application execution.

Second, the software programmer can encrypt query requests with CC1 encryption and verify responses before allowing application processing to continue. These encrypted queries are decrypted based on algorithm descriptors stored in the EEPROM 134.

Third, the software programmer can download pre-CCI-encrypted software program code with a LOADEX command and execute the program code in the hardware key 114 during application run-time. In this case, programs are decrypted and executed in RAM 132.

Fourth, the software programmer can store encrypted software program code and multiple traps in the EEPROM (134) with a LOADCONTEXT command. Procedures can be activated in one of two ways. First, the trap can be programmed within the hardware key so that when a particular command is present at the data buffer in the RAM 132, the trap procedure is executed allowing the trap procedure to operate on the data buffer. This capability allows the software programmer to effectively create a custom query engine. Alternatively, the trap can also be activated when a program resident in the RAM 132 calls an EEPROM 134 procedure.

Figure 8A:
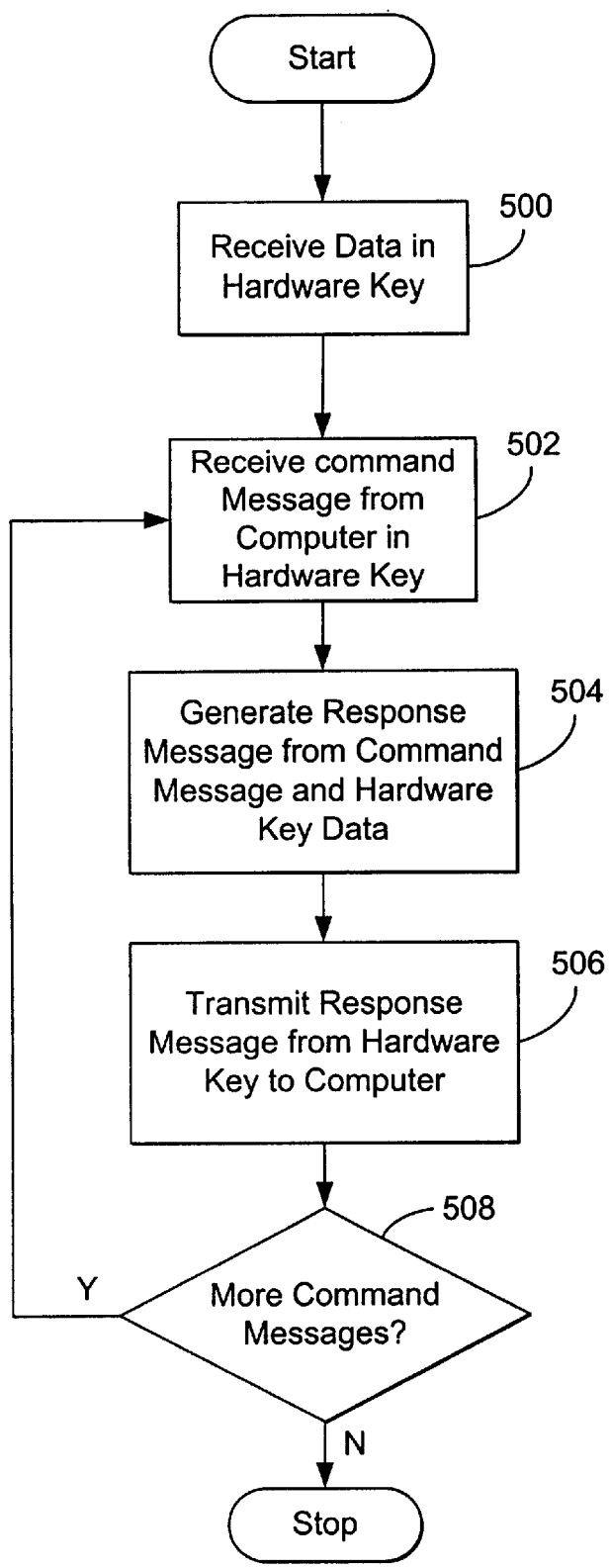
FIGS. 8A–8D are flow charts showing the operation of the present invention.

The operation of the present invention is shown in FIGS. 8A–8D. FIG. 8A shows the overall operation of the present invention. Block 500 receives data in the hardware key 114. In block 502, a command message is received from the host computer 100 in the hardware key 114. Block 504 generates a response message from the command message and the data stored in the hardware key 114. In block 506 the response message is transmitted from the hardware key 114 to the host computer 100. If more command messages 508 are received, the process begins anew by receiving the additional command messages 502. If no additional command messages are received, the process ends.

Figure 8B:
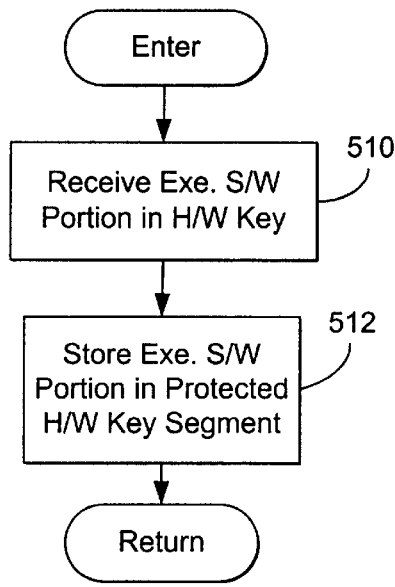

FIG. 8B shows the operation of the present invention when the data received in the hardware key 114 is a portion of the executable software. First, the executable software portion is received in the hardware key 114. This is depicted in block 510. In block 512, the executable software portion is stored in a protected memory segment of the hardware key 114.

Figure 8C:
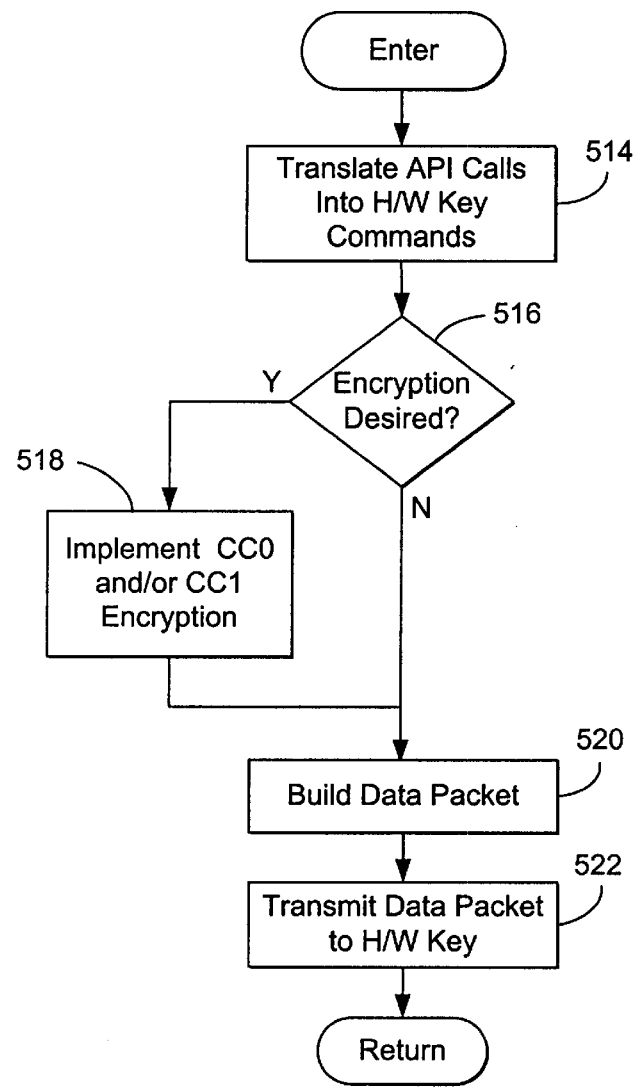

FIG. 8C shows how command messages are received from the host computer 100 in the hardware key 114. First, as depicted in block 514, API calls are translated into hardware key 114 commands. If encryption is selected, CC0 or CC1 encryption 518 is implemented. As shown in block 516, if encryption is not desired, CC0 or CC1 encryption is not implemented. Block 520 builds a data packet based on the API calls. Block 522 transmits a data packet to the hardware key 114.

Figure 8D:
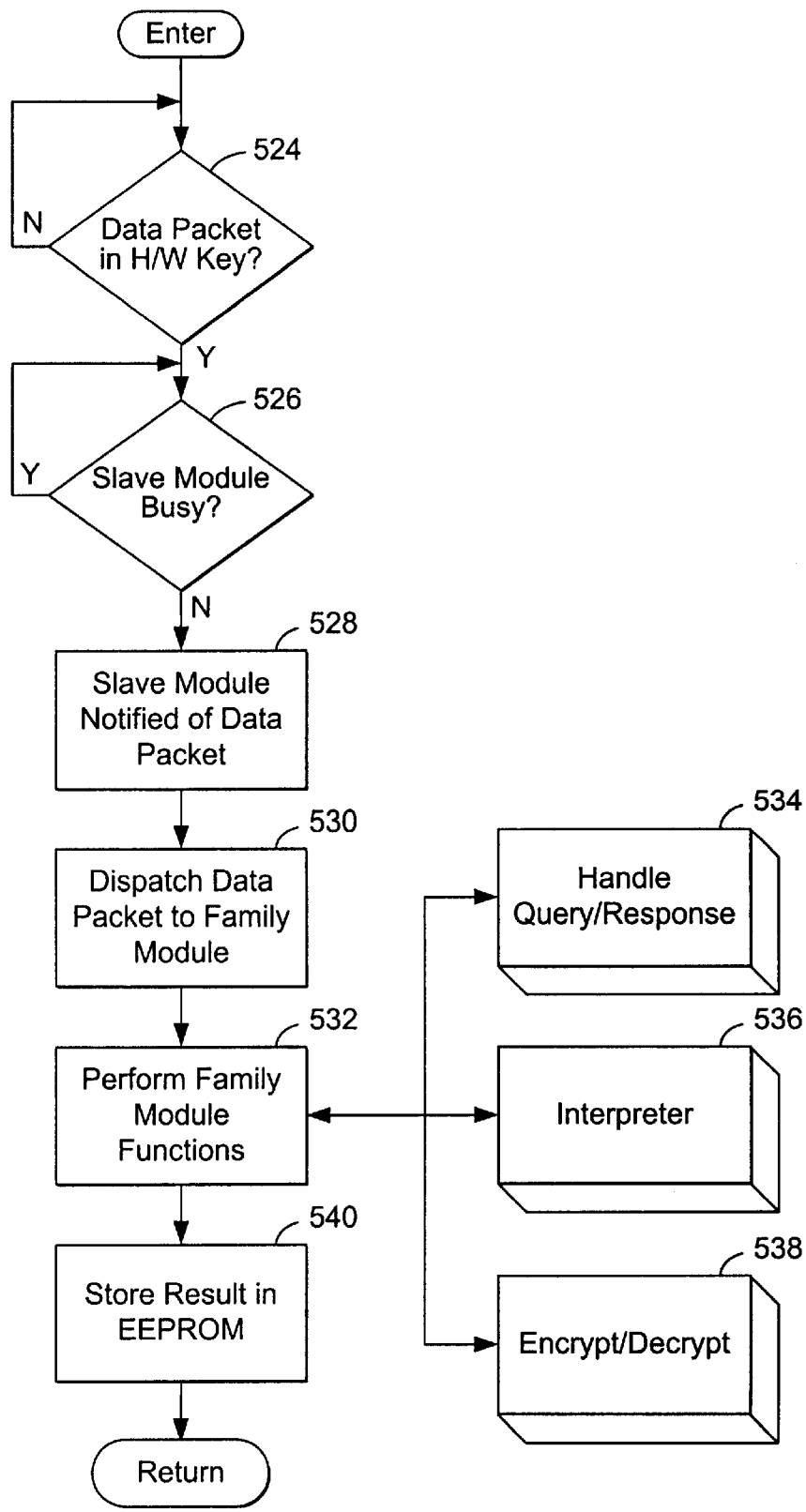

The operations performed in generating a response message from the command message in the hardware key data are shown in FIG. 8D. Block 524 determines whether a data packet is available at the hardware key 114. If so, block 526 checks to determine if the slave module 306 is busy. When a data packet is available at the hardware key and the slave module is not busy, block 528 notifies the slave module 306 of the data packet. Block 530 dispatches the data packet to a command class module. Block 532 performs the command class module functions called for in the data packet. The query response handler 534, the interpreter 536, and the encrypt/decryptor 538 modules are accessed in support of performing the command class module functions in block 532. Finally, block 540 stores the result of the command class module functions in EEPROM 134.

Hardware Key Programming

To use the present invention to protect a software application, the software developer must first program the hardware key 114. Hardware key programming is accomplished with the aid of a developer key 115, which, like the hardware key, includes a processor and a secure memory where critical data such as the CC0 and CC1 keys and query algorithm information may be stored.

The operations to program the hardware key 114 are presented in flow chart form in FIG. 9. First, as shown in block 600, the software developer must segment the application program 120 into two segments. One of these segments will remain unencrypted, and the other will be encrypted and stored in the hardware key 114. Generally, after segmenting, the resulting application is a mixture of a plurality of encrypted hardware key binary code instruction sets (corresponding to the encrypted software segment) interspersed in multiple locations within the host binary code (host processor code instructions corresponding to the unencrypted software segment). In segmenting the application program 120, the software developer must decide which functions or data to implement in the hardware key 114. In theory, this could be any function which is necessary for operation of the application program, ordinarily a function with an input-output relationship. Practical considerations may govern the choice of this function, because communications between the host computer 100 and the hardware key 114 and the speed of the microprocessor 130 may result in unacceptable processing and communication delays.

For example, the software developer may want to implement a simple function in the hardware key 114 which is activated when queried by the host computer 100. For purposes of illustration, suppose the selected function simply takes two input values, A and B, and adds them together to obtain a third value, C. Further assume that only CC0 encryption is desired.

The software developer is provided with a developer key 115 which is communicatively coupled to a developer computer used for development of the application program. The developer computer is similar in all relevant respects to the host computer 100. The developer key 115, which simulates aspects of the hardware key 114, allows the application program compiler to CC0 encrypt the string. The CC0 key or algorithm is protected because only the developer key can perform CC0 encryption, and the CC0 algorithm and key are not discernible from the developer key.

Using software supplied with the hardware key the software programmer would define the EEPROM cells which will read the two input parameters A and B. Then, the software programmer codes the function itself, that is, A plus B. Then, the program is compiled, resulting in a string which can be interpreted by the interpreter module 344. As shown in block 602, this string is transmitted to a software developer unique developer key 115, which encrypts the string with the CC0 key, as depicted in block 604. The result is an interpretable string that represents the CC0 encrypted program object file.

As indicated in block 606, the software developer receives this encrypted string, and can now store the CC0 encrypted string in the hardware key 114 that is provided to the software end-user so that it may be decrypted and operated during run time. This is indicated by block 626. Alternatively or in addition to this, the software developer may store the CC0 encrypted string in the application program as a data value that can be accessed and operated on by one of the APIs 121. This is indicated by block 610.

When a software program is purchased, the end-user is provided a hardware key 114, in which the CC0 and CC1 encryption algorithms and keys are stored. The hardware key 144 is coupled to an I/O port 112 of the host computer 100, and the unencrypted and encrypted CC0 program object files are stored in the host computer 100.

As indicated in block 612, when the protected application is run, the A and B parameters described above are stored in the EEPROM 134 using a WRITE API command, followed by a LOADEX command referencing the CC0 encrypted string. In block 614, the hardware key 114 then decrypts the string using the encryption module 348, and the C-command class functions in the slave module 306 to store the software segment instructions in a secure portion of the hardware key 114, as shown in block 616. Next, in block 618, the hardware key 114 performs the required instructions, using the interpreter 344, the query engine 346. The result is stored in the designated area of EEPROM 134, where the application program, using the READ API can access the data and determine whether the application program process should proceed or terminate. If CC1 encryption is desired, the data is encrypted as shown in block 624 before it is provided or transmitted to the host computer 100.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of securing software executable on a computer, comprising the steps of:
   (a) segmenting the software into a first and a second software segment;
   (b) transmitting the first software segment to a first hardware key communicatively coupled to a developer computer, the first hardware key comprising a first hardware key processor and a first hardware key memory, the first hardware key memory having a secure segment with a first encryption key stored therein;
   (c) encrypting the first software segment using the first encryption key and the first hardware key processor; and
   (d) receiving an encrypted first software segment from the first hardware key.

2. The method of claim 1, further comprising the steps of:
   (a) storing the encrypted first software segment and the second software segment in a host computer communicatively coupled to a second hardware key comprising a second hardware key processor and a second hardware key memory having the first encryption key stored therein;
   (b) transmitting the encrypted first software segment to the second hardware key;
   (c) decrypting the encrypted first software segment using the first encryption key to produce flint software segment instructions;
   (d) storing the first software segment instructions in a secure portion of the second hardware key memory;
   (e) performing the first software segment instructions by the second hardware key processor to produce a response message; and
   (f) transmitting the response message to the host computer.

3. The method of claim 2, wherein the response message is encrypted before transmission to the host computer.

4. The method of claim 1 further comprising the steps of:
   (a) transmitting the encrypted first software segment from the first hardware key to a second hardware key, the second hardware key comprising a second hardware key processor and a second hardware key memory having a secure segment with the first encryption key stored therein; and
   (b) storing the encrypted first software segment in the secure segment.

5. The method of claim 1, further comprising the steps of:
(a) storing the second software segment in a host computer communicatively coupled to a second hardware key comprising a second hardware key processor and a second hardware key memory having the first encryption key securely stored therein;
(b) decrypting the encrypted first software segment using the first encryption key to produce first software segment instructions;
(c) storing the first software segment instructions in a secure portion of the second hardware key memory;
(d) performing the first software segment instructions by the second hardware key processor to produce a response message; and
(e) transmitting the response message to the host computer.

* * * * *

UNITED STATES PATENT AND TRADEMARK OFFICE
CERTIFICATE OF CORRECTION

PATENT NO. : 6,523,119 B2
DATED : February 18, 2003
INVENTOR(S) : Dominique Vincent Pavlin et al.

It is certified that error appears in the above-identified patent and that said Letters Patent is hereby corrected as shown below:

Title page,
Item [57], ABSTRACT,
Line 5, "a means" should read -- an interfacing port --

Column 16,
Line 48, "flint" should read -- first --

Signed and Sealed this

Fifth Day of August, 2003

JAMES E. ROGAN
*Director of the United States Patent and Trademark Office*